United States Patent [19]

Glassey et al.

[11] 4,274,039
[45] Jun. 16, 1981

[54] SERVO-AMPLIFIER CIRCUIT

[75] Inventors: Gene Glassey, San Diego; Aldan D. Gomez, El Cajon, both of Calif.

[73] Assignee: Fluid Data Systems, San Diego, Calif.

[21] Appl. No.: 124,623

[22] Filed: Feb. 25, 1980

[51] Int. Cl.³ .............................................. G05B 11/01
[52] U.S. Cl. .................................. 318/678; 318/676; 318/642
[58] Field of Search ........................ 318/676, 678, 642

[56] References Cited

U.S. PATENT DOCUMENTS

| 2,722,641 | 11/1955 | Cross | 318/482 X |
| 3,041,512 | 6/1962 | Zeigler et al. | 318/676 X |
| 3,102,217 | 8/1963 | Bullen | 318/676 X |
| 3,936,717 | 2/1976 | Hardin | 318/676 |
| 4,123,696 | 10/1978 | Olsen | 318/676 X |

Primary Examiner—B. Dobeck
Attorney, Agent, or Firm—Julian Caplan

[57] ABSTRACT

A circuit for a servo-amplifier saves power when the position servo has reached balance. The servo input is a high frequency differential transformer having its armature positioned by mechanical means driven by a servo motor controlled through amplifier circuitry. The power to the amplifier is turned off in the vicinity of the servo null point.

8 Claims, 5 Drawing Figures

SERVO-AMPLIFIER CIRCUIT

This invention relates to a new and improved servo-amplifier circuit. More particularly, the invention relates to battery powered gauges such as those used to measure the depth of liquids in bodies of water, tanks, etc., at remote sites where conventional electrical power lines are not available. It is further designed for use over a broad temperature range representative of the ambient temperature extremes found in nature, approximately −50° to +150° F.

Although the present invention is described in an application for measuring pressure at the bottom of a body of water by means of a fluid pressure gauge, it will be understood that the invention also has application to other instruments. Further, although in the present invention a differential transformer is illustrated and described, with certain modifications the same principles could be applied to other transducers such as potentiometric, strain gauge, capacitance bridge and optical systems.

The present invention has particular advantage in that low quiescent current requirements exist at null of the position of the armature in the differential transformer, the current through the power source is cut off, greatly reducing the drain on the battery.

Another feature of the invention is that whereas in prior systems a frequency of about 2.5 KHz has been employed, in accordance with the present invention 20 to 40 KHz with a preferred 30 KHz frequency is desirable, employed in combination with a specific type of differential transformer having low primary inductance and suitable for use at elevated excitation frequency. At lower frequencies, the tuning capacitors must be of relatively high value, necessitating dielectrics of plastic film, ceramic, etc., which are prone to drift with ambient temperature. Accordingly, the capacitors are of low value, in the low picofarad rather than the fractional microfarad range. Such capacitors may have dielectrics of mica or glass and are intrinsically quite stable. At low frequencies, two capacitors are generally used to tune the two halves of the DT. Slight drifts in these capacitors cause drift in instrument reading. As hereinafter described, such capacitors are replaced in the present circuit by a single, very small, capacitor spanning the output. Hence, symmetry is no longer required and a good wave form and a high amplitude sine wave results.

An important feature of the invention is the "power save" circuit incorporated in the servo design, operated when the position servo has reached balance. This reduces the quiescent current drain on the battery operated linear servo drive amplifiers. The supply voltage to the power output amplifier is turned off at null balance in such manner that no transients or errors are introduced into the operation of the servo system.

Accordingly, an off point centered on the null position of the servo has the additional feature of improving the stability of the system. Thus, there is a region which damps the motion of the servo when the null position is being rapidly approached, and this eliminates overshoot conditions or tendencies. Uniquely, the presence of the narrow dead zone has remarkable benefit toward damping with scarcely discernible loss of resolution as compared to "notch-closed" or full "live" operation per conventional servo-practice.

A further feature of the invention is that the circuit may be incorporated into existing servo designs without disturbing the basic stability of the servo configuration. This achievement is a result of tapping the signals from existing circuits and modifications of the power connections required to the power portion of the servo.

With appropriate minor variations, the circuit arrangement hereinafter described is independent of the type of position sensing detector. Since the circuit arrangement taps the signal from portions of the circuit after the detection of the error, the type of detector is relatively unimportant.

Continuous, smooth adjustment of operation from the "power save" to normal operation is achieved without disturbance or errors to the position or null accuracy of the system with the exception that a very narrow dead zone or "notch" exists at null. In practice, this notch is of negligibly narrow width, characteristically approximating one microinch of armature movement.

A further feature of the invention is that the circuit is composed of conventional linear operational amplifiers, logic circuits, diodes and transistors, which can be configured to provide smooth operation of a power save circuit that incorporates no relays or mechanical switches.

Another feature of the invention is the provision for means of setting the width of the "power off" or notch region, which results in a predetermined precision setting for the system.

Other objects of the present invention will become apparent upon reading the following specification and referring to the accompanying drawings in which similar characters of reference represent corresponding parts in each of the several views.

Figure 1:
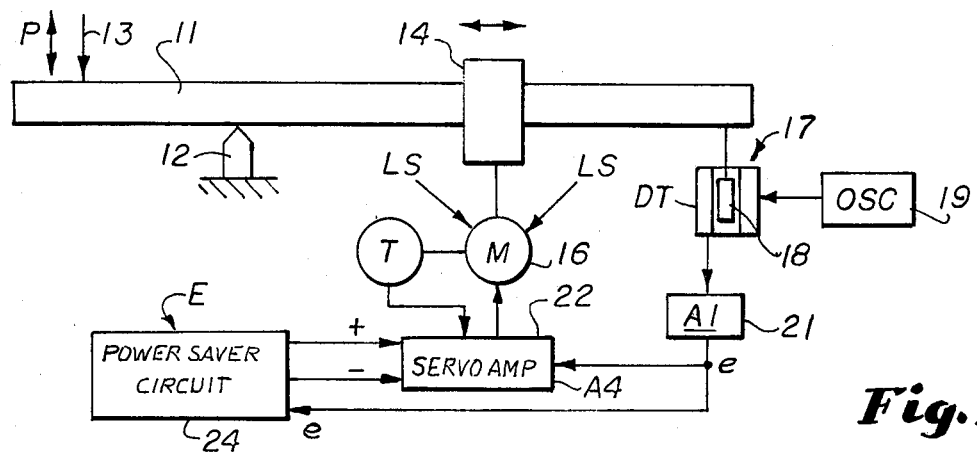
FIG. 1 is a schematic electro-mechanical view of one application in which the present invention may be applied.

Use of the present invention is illustrated in FIG. 1. A fluid pressure gauge is illustrated schematically. Thus, there is a beam balance 11 having a fulcrum 12. The pressure to be measured (e.g., by means of a purge bubble principle), the depth of a body of water is applied as is shown by the arrow 13 to tilt the beam 11 in a counter-clockwise direction. This tilting movement is resisted by a poise 14 movable along beam 11 and tending to tilt the beam in the reverse direction. Movement of the poise 14 is controlled by a servo-motor 16 by means forming no part of the present invention. At one end of the beam 11 is a differential transformer 17 having an armature 18 whose position is controlled by the beam 11. The primary winding of differential transformer 17 is energized by oscillator 19, and the output is fed to amplifier 21. The output of amplifier 21, designated e in FIG. 1, is fed both to the servo-amplifier 22 and to the power save circuit 24. A reference voltage e is applied to the power save circuit 24. Positive and negative voltages from the circuit 24 are fed to the servo-amplifier 22, and these control the motor 16, tending to move the poise 14 so that the armature 18 is at electrically centered null position of differential transformer 17. As a further feature of the invention, tachometer generator 23, driven by motor 16, feeds back to the servo-amplifier 22 for anti-hunt damping.

It will be understood that the foregoing is only one representative example of use of the present invention.

Thus the servo input is a differential transformer of conventional design operating at high frequency (i.e., 20–40 KHz and preferably 30 KHz), the position of the armature of the transformer being driven by the servo motor. The output of differential transformer 17 is detected and filtered in a conventional manner. The differential output which is developed from this detection and filtering circuitry is applied to the input of differential amplifier 21. The voltage output of amplifier 21 is e. The voltage e operates as the input to the servo amplifier 22 through the gain potentiometer Rg. The voltage e is also used as an input to the power save circuit 24, and is applied to the summing input ⊗ through two paths.

The first path is through the resistor $2R_o$ and the second is through the amplifier $A_2$. The gain characteristic of the amplifier $A_2$ is designed to be non-linear to produce the required gain. The voltage curve shown in FIG. 4A which portrays the value of voltage generated for a given displacement of the differential transformer 17 is operated upon by the amplifier $A_2$ to produce the curve shown in FIG. 4B. The gain required to produce this voltage is equal to zero for e negative and equal to 1 for all value positive.

Figure 4:
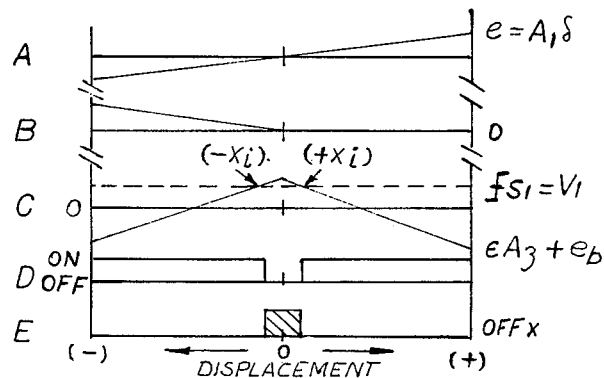
FIG. 4 is a series of five superimposed graphical representations of conditions of the circuit.

The inversion of the voltages at the input to the output results in FIG. 4B. This required effect may be produced with a number of specialized circuits utilizing diodes and active components. One specific way that this may be accomplished is by using a diode as the feedback component of an operational amplifier.

The output of amplifier $A_2$ is coupled to the summing point ⊗ through the resistor $R_o$ which is one-half the value of $2R_o$. This results in twice the contribution of the output $A_2$ than the $2R_o$ to the input of amplifier $A_3$. Since the output of amplifier $A_2$ is opposite in phase to the contribution through the resistor $2R_o$, the addition of the non-linear and the linear outputs results in the absolute value of the voltage e.

A reference current is supplied to the summing junction through the resistor Rs to provide a method of adjusting the level of the output of amplifier $A_3$. Reference current is adjusted by the resistor $R_B$. The resulting output is shown in FIG. 4C along with other reference points. The solid line in FIG. 4C is the result of the addition of the absolute value of e and the reference input. This is represented in FIG. 4C as E $A_3$ plus $e_b$, where the absolute value of e is E.

The output of $A_3$ is applied to the Schmitt trigger $S_1$ which is used to establish the threshold level for the operation of the two switches $S_2$ and $S_3$. The threshold level of $S_1$ is drawn as the dotted line labelled $V_1$ in FIG. 4C. In FIG. 4C, the intercept of the dotted and solid lines represented by positive $+X_i$ and $-X_i$ are the points at which the Schmitt trigger operates. The region between the two intercepts is the region in which the Schmitt trigger is operated.

Activation of the Schmitt trigger operates the two switches $S_2$ and $S_3$ to the "off" state, removing battery voltage to the power servo-amplifier $A_4$. Since the operation of the switches removes the voltage to this amplifier, the quiescent current no longer drains the battery pack. This arrangement results in the power to operate heavy servo-balancing systems with the low power operation when the unit is in the balance condition. The low power operation is the result of MOS circuitry being used for the active portion of the system. The total drain of the entire system when in the power "down" mode can be kept to a few milliamperes. This results in the operation of a system designed with this circuit of many months on small battery packs, dependent upon the conventional considerations of amp-hour ratings and ambiant temperature.

The width of the region of minimum power normally would be considered a serious limitation to the sensitivity of the servo balance system. However, this is overcome by the adjustment of the "notch" control of the amplifier $A_3$. This adjustment coupled to the resistor $R_b$ can result in the increase of sensitivity to any degree desired. The limit of the adjustment is the point where the noise of the amplifier operates the "power on" by appearing as an unbalance in the power save circuit. This continuous operation of the range of the potentiometer $R_b$ to achieve any degree of "off" with $4e$, allows the servo to be adjusted in the normal manner before the operation of the power save circuit.

Figure 2:
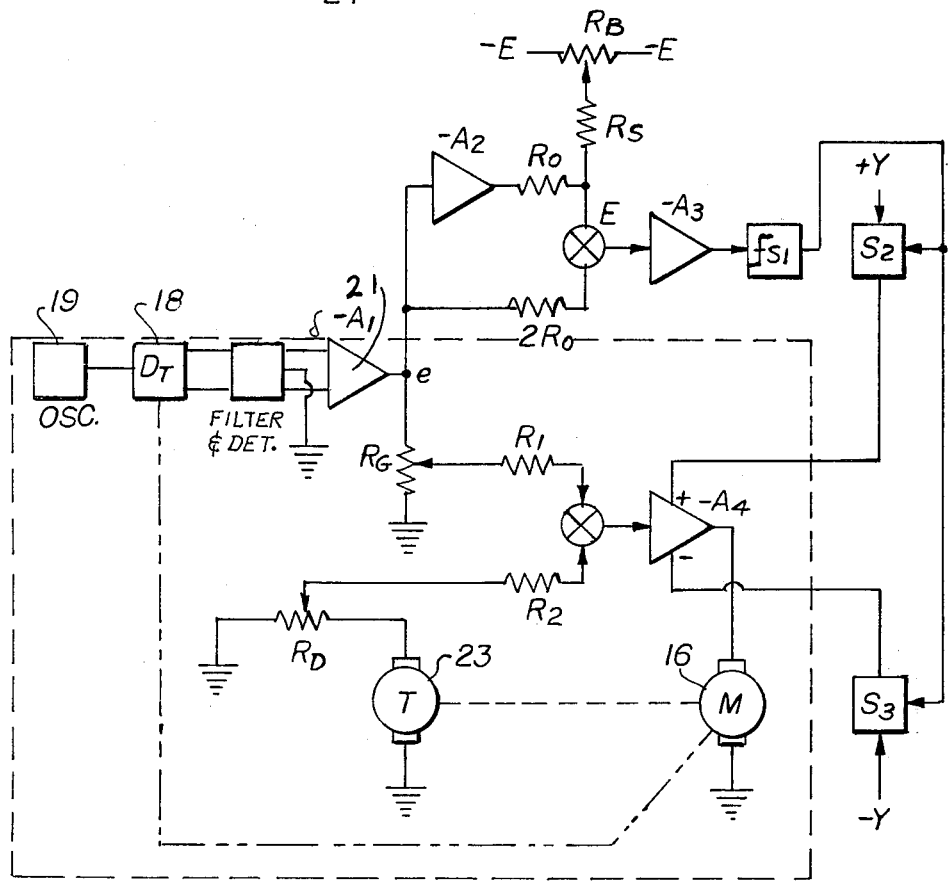
FIG. 2 is a schematic diagram of the power save circuit.
Figures 3, 3A:
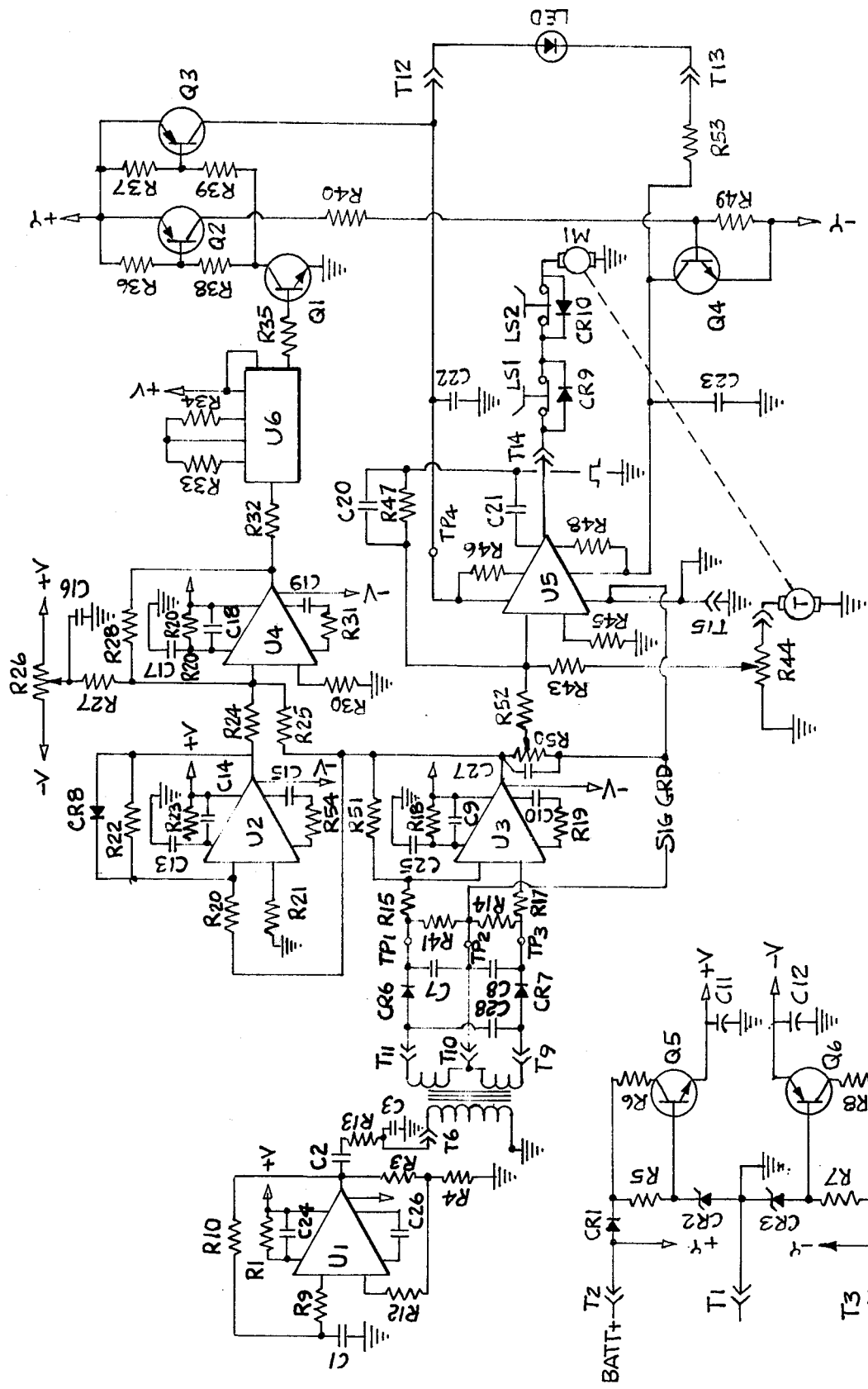
FIG. 3 is a wiring diagram of one preferred circuit.
FIG. 3A is a wiring diagram for the power supply of the circuit of FIG. 3.

Referring now to circuit diagram FIG. 3, one suitable circuit is illustrated. In this embodiment, corresponding components of FIG. 2 are:

| FIG. 2 | FIG. 3 |
|---|---|
| $A_1$ | U3 |
| $A_2$ | U2 |
| $A_3$ | U4 |
| $A_4$ | U5 |
| $R_o$ | R24 |
| $2R_o$ | R25 |
| $R_1$ | R52 |
| $R_2$ | R43 |
| $R_D$ | R44 |
| $R_s$ | R27 |
| $fS_1$ | U6 |
| $S_2$ | Q3 |
| $S_3$ | Q4 |
| OSC | U1 |

Suitable values for the components of FIG. 3 are shown in the following table:

| | |
|---|---|
| R 1, 9, 12 | 1M |
| R 3, 13, 15, 17, 20, 22, 24, 31, 32, 54 | 100K |
| R 5 | 36K |
| R 6, 8 | 1K |
| R 14, 25, 41, 47 | 200K |
| R 18, 23, 28, 29, 51 | 22M |
| R 19 | 500pF |
| R 26 | 250K |
| R 27 | 1Meg |
| R 30 | 68K |
| R 10, 33, 34, 35 | 10K |
| R 36 | 470 |
| R 37, 49 | 510 |
| R 38 | 2.4K |
| R 39, 40 | 2.2K |
| R 43 | 2.2M |
| R 44 | 5K |
| R 45 | 30K |
| R 46, 48 | 0.47 1/2W |
| R 50 | 50K |
| R 52 | 51K |
| R 7, 53 | 22K |
| C 1, 14, 15, 19 | 500pF |
| C 2 | 0.1 μF |
| C 3 | 0.005 |
| C 4 | 10K |

The values assigned above to various components are subject to design variation.

| | |
|---|---|
| C 7, 8 | 1.0 |
| C 9, 60 | 400pF |
| C 10 | 220pF |
| C 11, 12 | 1000μF |
| C 13, 16, 17, 25 | 0.01 |
| C 18 | 33pF |
| C 20 | 0.047 |
| C 21 | 550pF |
| C 22, 23 | 4.7 |
| C 24 | 100pF |
| C 26 | 10pF |
| C 27 | 0.02 |
| C 28 | 47pF |
| U 1, 2, 3, 4 | RCA CA 3078 AT |
| U 5 | NSC LH 0021 CK |
| U 6 | MC 14583 B |
| CR 1, 6, 7, 8, 9, 10 | IN 4001 |
| CR 2, 3, 4 | IN 4101 |
| Q 1 | 2N 3565 |
| Q 2, 6 | 2N 3638 |
| Q 3 | 2N 5193 |
| Q 4 | 2N 5190 |
| Q 5 | 2N 3565 |

What is claimed is:

1. In a servo circuit of the type having a transducer, a differential amplifier for said transducer, a second amplifier, sources of + and − DC power for said second amplifier, the voltage output of said first amplifier controlling said second amplifier and a servo motor driven from said second amplifier, the improvement which comprises:
   a first resistor connected to the voltage output of said first amplifier and to a summing point,
   a non-linear gain characteristic third amplifier connected to the voltage output of said first amplifier,
   a second resistor of one-half the value of said first resistor connected to the output of said third amplifier and to said summing point,
   a source of reference currents connected to said summing point,
   a fourth amplifier receiving all of the signals at said summing point,
   off-on first switch means connected to said fourth amplifier operable only the voltage output of said fourth amplifier exceeds a pre-selected threshold level,
   a second switch between said source of + DC current and said second amplifier, and
   a third switch between said source of − DC current and said second amplifier,
   said first switch being arranged to open both said second and said third switches only when said first switch is operable.

2. A circuit according to claim 1 in which said transducer is a differential transformer having an armature whose position is related to energization of said servo motor.

3. A circuit according to claim 2 in which said transformer is oscillated in the range of 20–40 KHz.

4. A circuit according to claim 1 which further comprises a potentiometer connected to said source of reference voltage operable to adjust the level of the output of said fourth amplifier and thereby to adjust the threshold of operation of said first switch.

5. A circuit according to claim 1 in which said first switch is a Schmitt trigger.

6. A circuit according to claim 1 which further comprises a generator driven by said servo motor, the output of said generator being fed back into said second amplifier to damp "hunting" of said servo motor.

7. A circuit according to claim 1 in which the output gain of said third amplifier is zero for all negative values at said summing point and a fixed voltage for all positive values at said summing point.

8. A circuit according to claim 1 in which the loss of performance of said circuit is essentially negligible compared with a fully live servo as contrasted.

* * * * *